Nov. 7, 1950        T. F. SAFFADY        2,528,611
METHOD OF MAKING ILLUSTRATED PHONOGRAPH RECORDS
Filed March 18, 1947        4 Sheets-Sheet 1
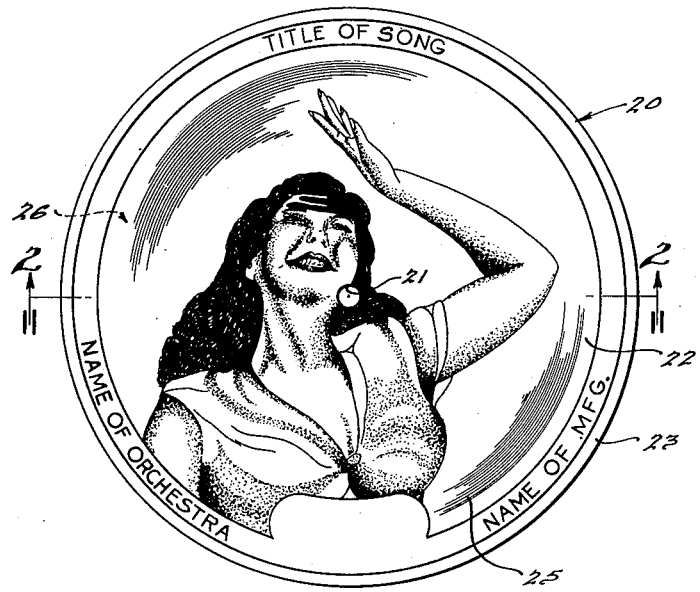
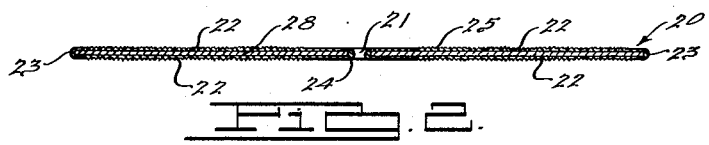
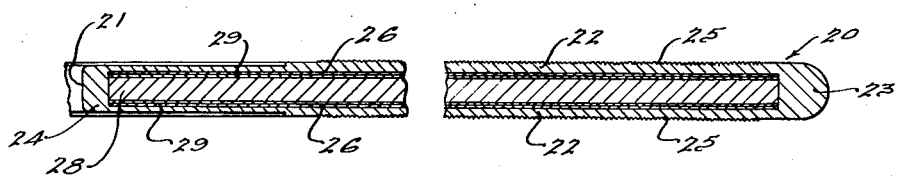
INVENTOR.
Thomas F. Saffady.
BY
Harness, Dickey - Pierce.
ATTORNEYS.

Nov. 7, 1950     T. F. SAFFADY     2,528,611
METHOD OF MAKING ILLUSTRATED PHONOGRAPH RECORDS
Filed March 18, 1947     4 Sheets-Sheet 2
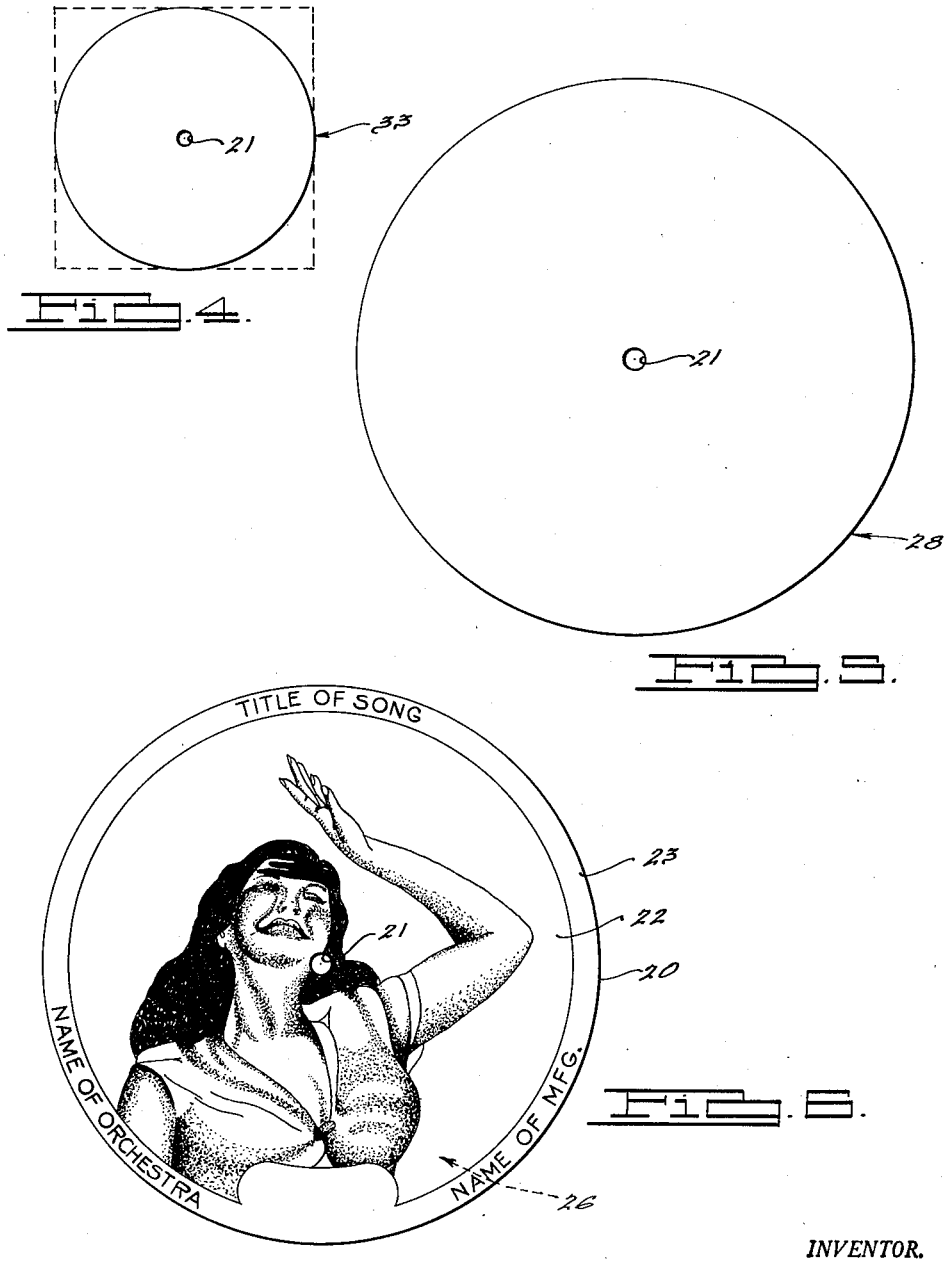
INVENTOR.
Thomas F. Saffady
BY
Harness, Dickey & Pierce
ATTORNEYS.

Nov. 7, 1950     T. F. SAFFADY     2,528,611
METHOD OF MAKING ILLUSTRATED PHONOGRAPH RECORDS
Filed March 18, 1947     4 Sheets-Sheet 3

INVENTOR.
Thomas F. Saffady.
BY
Harness, Dickey & Pierce.
ATTORNEYS.

Nov. 7, 1950           T. F. SAFFADY          2,528,611

METHOD OF MAKING ILLUSTRATED PHONOGRAPH RECORDS

Filed March 18, 1947                                 4 Sheets-Sheet 4

INVENTOR.
Thomas F. Saffady
BY
Harness, Dickey & Pierce.
ATTORNEYS.

Patented Nov. 7, 1950

2,528,611

UNITED STATES PATENT OFFICE

2,528,611

METHOD OF MAKING ILLUSTRATED PHONOGRAPH RECORDS

Thomas F. Saffady, Detroit, Mich., assignor, by direct and mesne assignments, of one-half to Vogue Recordings, Incorporated, Warren Township, Mich., a corporation of Michigan, and one-half to William T. Sevald, Royal Oak, Mich.

Continuation of application Serial No. 612,436, August 24, 1945. This application March 18, 1947, Serial No. 735,280

9 Claims. (Cl. 154—110)

1

This invention relates broadly to phonograph records and more particularly to pictorially illustrated records wherein the illustration is embedded in and visible through the surface of the record.

Considered in certain of its broader aspects the record embodying the present invention comprises a generally disc-shaped sheet metal core having a pictorial illustration suitably bonded thereto and a transparent thermoplastic material extruded over the core and bonded to the illustration. The sound track of the record is impressed into the plastic material simultaneously with the extrusion operation and the arrangement is such that the illustration is visible through the sound track as well as the adjacent smooth portions of the record. According to the present invention the illustration is bonded to the core, the plastic material is extruded over and bonded to the illustration and the sound track is impressed into the plastic material in a single operation.

An illustrated record of the above-mentioned character cannot be made by methods conventionally employed in the record pressing art, and methods and techniques generally employed to extrude or mold plastic materials have been of little value in this instance. As the present invention developed, many problems and difficulties were encountered which resulted in failure of one or more components of the record. It was not until entirely new procedures were devised that a commercially practical record was produced and this application constitutes a continuation of my application, Serial No. 612,436, filed August 24, 1945, now abandoned.

In this art it is necessary to maintain low manufacturing costs in order to compete commercially with conventional-type records. This factor alone practically eliminates every type of illustration except a paper print; however, if paper is used for the illustration it must be suitably covered or protected in order to keep it clean and to preserve it under conditions of normal handling and abuse. This can best be done by making the record of a suitable, transparent, plastic material and sealing the illustration therein. In order to do this, however, the plastic material must be pressed or extruded over the paper illustration; and, from a practical standpoint, it is very difficult to do this without rupturing the core, exploding the paper, distorting the illustration or leaving air pockets between the paper and the plastic coating.

It has now been discovered that a commer-

2 cially practical and mechanically satisfactory illustrated record can be made by properly mounting a paper illustration on a thin, resin-coated, metal backing or core and then extruding a suitable plastic material over the reinforced illustration. Any suitable transparent material such as glass, natural or synthetic resin or the like may be used for the outer coating but a particular vinylite resin is preferred for reasons hereinafter brought out in detail.

It has been found essential that the plastic material be extruded radially outwardly from the center of the core to eliminate air pockets between it and the die and between it and the illustration. Air pockets between the plastic material and the die cause blank spaces in the sound track, and air pockets between the plastic material and the illustration are visible as air bubbles in the record face.

Also, it is essential to impress the sound track in the plastic material, as cutting a record track destroys the high transparency of the material. The core must have high tensile strength and there must be a proper bond between the illustration and the core in order properly to support the relatively weak paper illustration and to prevent distortion or explosion of the illustration during the extruding operation. Cores of heavy fiber, cardboard, coated canvas and the like, are not sufficiently strong and explode or rupture during the extruding operation.

Commercially it is highly desirable to form the record in a single operation. To do this it is necessary that all components of the record be assembled in the press and bonded together in one operation of the latter. Thus, at the time the press is operated the paper illustration is not actually attached to the core. In order to prevent destruction of the relatively weak paper illustration under these conditions it is necessary that the bond between the core and the paper take effect by the time the outer plastic material begins to flow in the press. If this is done the paper can sustain the lateral or radial stresses created therein by the plastic as it flows in the press.

The core must possess substantial tensile strength, lateral rigidity, and skin hardness. If these properties are not present, the record will come from the press in a warped, ruptured, or exploded condition. Also, the core must have high heat conductivity; otherwise, it tends to tip or cant in the press. If this occurs the core may be forced against the stamping matrices and damage the sound tracks. Apparently, tipping is due to uneven heating of the matrices which causes uneven flow of the plastic material at opposite sides of the core. However, if a core of the type here recommended is used, equalized flow of the plastic material is assured. Excess flow of the plastic on one side of the core is resisted by the lateral rigidity of the latter and excess heat on either side of the core is transferred therethrough to balance the temperatures and assure uniform plasticity in the masses of material on either side thereof. Thus, the properties of lateral rigidity and heat conductivity prevent the core from tipping in the press. The property of tensile strength prevents the core from rupturing, exploding, or warping in the press. The hard-skinned quality of the core insures resilience in the record so that the latter will resume its original flat shape after being flexed or bent.

The illustrations preferably are printed on paper by the "off set" method. For best results, the paper must be porous, and unglazed so that it becomes saturated or the surface substantially saturated with the adhesive which binds it to the core. Also, the paper should be untreated and relatively thin so as not to interfere with the heat conducting property of the core and to assure complete or substantially complete penetration by the bonding material. Relatively complete penetration is desirable so that substantially every fiber in the paper is bonded to the core. If the paper is thick or some other condition exists which prevents absorption of or penetration by the bonding material, the unbonded layer or portion of the paper will be fastened to the core only by the interlocking engagement of the individual fibers. Experience shows that the fibers alone are unable to withstand the shearing stresses created in the paper by outward flow of the plastic during the extruding operation. As a result, the unbonded portion of the paper tends to shear or peel away and to slide transversely across the subjacent bonded strata with a consequent distortion of the illustration. The use of solvents or lubricants to reduce friction has been found unsatisfactory as they tend to prevent a proper bond between the plastic material and the paper.

Another important factor is the bonding agent which fastens the paper to the core. This bonding agent must possess unusual properties which not only secure the pictorial illustration to the core but also hold it against thrust by the plastic material as it flows outwardly in the press. The bond must take effect substantially instantaneously and the bonding material should be homogeneous with the plastic material; otherwise, a reaction may occur which ultimately results in disintegration of the record. This disintegration generally is characterized by formation of blisters or bubbles between the core and the outer plastic layer. Also, it is important that the bonding material have an electrical attraction for the core as well as a surface tension attraction. This is necessary as the hard-skinned metal core is only slightly porous and I have found that a bond which merely relies upon surface tension for its strength may be inadequate for its intended purpose. Nor can the efficacy of a surface tension bond be increased in this case by etching the surface of the core as this destroys the hard-skinned qualities of the latter and causes it to lose its resilience.

Temperatures and pressure employed in the extruding step are critical and it is advisable to pre-heat the core and plastic material to obtain a first-class product on a high production scale.

From the foregoing it will be readily apparent that a principal object of this invention is to provide a phonograph record which is pictorially illustrated over substantially its entire area and wherein the illustrations are visible through the material which carries the sound track as well as the sound track itself.

Another object of the invention is to provide a record of the above-mentioned character having a surface-hardened core which possesses the necessary qualities of tensile strength, flexibility, and electrostatic attraction for a bonding agent.

Still another object of the invention is to provide a record of the above-mentioned character wherein the bonding agent is capable of affixing itself substantially instantaneously, possesses an electrostatic attraction for the core, and is homogeneous with the plastic outer material of the record.

Yet another object of the invention is to provide a commercially satisfactory method of extruding the plastic record material over a paper illustration.

A further object of the invention is to disclose the most advantageous operating temperatures for the forming press together with the most advantageous preheating temperatures for the core and the plastic material as well as the time cycles of press operation and preheating.

Various other objects and advantages of the invention will be apparent during the course of the following description.

In the drawing, forming a part of this specification and wherein like numerals are employed to designate like parts throughout the same, Fig. 1 is a top plan view of a record embodying the invention and showing the manner in which the pictorial illustration is visible through the plastic outer layer and the sound track, Fig. 2 is a vertical sectional view taken on the line 2—2 of Fig. 1, Fig. 3 is an enlarged, vertical sectional view similar to Fig. 2 but showing the various components of the record in greater detail, Fig. 4 is a top plan view of a biscuit or preform of plastic material, the preferred shape of the preform being shown by full lines and an optional shape by dotted lines, Fig. 5 is a top plan view of the core, Fig. 6 is a top plan view of a suitable and typical paper illustration.

Figure 7:
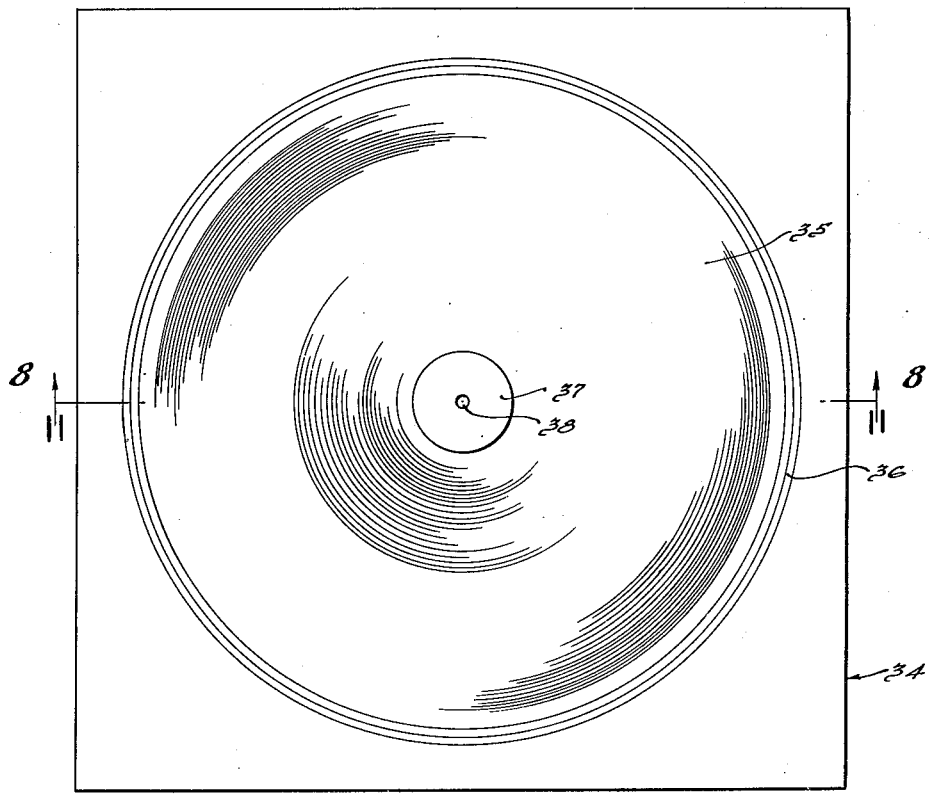
Fig. 7 is a face view of a matrix used in pressing the record.

Reference is now had to the drawings and particularly to Figs. 1, 2 and 3 which show a finished record 20 embodying the present invention, which record is of conventional shape and size and has the usual aperture 21 for receiving the center post of a phonograph turntable (not shown). The entire outer surface of the record 20 is coated with a film or layer of transparent thermoplastic material 22, which material is concentrated at the outer and inner edges of the record to define the rims 23 and 24 respectively. Sound tracks 25 are impressed into the flat surfaces of the material 22 when the record is formed. In this connection, it is important to note that the transparency of the plastic material 22 is not destroyed if the sound tracks are made in this manner; but, the transparency is destroyed if the sound tracks are cut into the material after the record is formed. This results from the fact that an impressed sound track has a smoothly contoured surface in the area of the track variations, whereas a sound track which is cut has a rough surface.

Sealed beneath the transparent plastic material 22 and on both sides of the record 20 is a pictorial illustration 26. In this instance, the illustration 26 is a fanciful drawing of a girl, and in every case it preferably is a pictorial interpretation of the recording. Also, the title of the recording, the name of the person or group making the recording, the manufacturer of the record, and the trade-mark under which the record is sold conveniently may be printed upon the illustration 26 and preferably along the margin as shown in the drawing.

Disposed centrally within the record 20 is a core 28 in the form of a flat disc of aluminum or the like. This core 28 is coated with a bonding agent or material 29 which bonds and secures the illustration 26 thereto.

For purpose of illustration, the procedure for making a 10 inch record as set forth in detail and in this connection attention is directed to Fig. 4 which shows a circular preform 33 preferably of calendered "Vinylite" resin. The preform 33 here shown is approximately .90" thick and 5½" in diameter; however, it may be square as indicated by dotted lines in Fig. 4. The "Vinylite" resin comprises a mixture of powdered resinous material known to the trade as "VYHH" and calcium stearate. The "VYHH" resin is produced by the Union Carbon and Carbide Co., and comprises about 87% vinyl chloride and about 13% vinyl acetate. The calcium stearate is used primarily for lubrication purposes and it preferably is present in an amount equal to about 2% by weight of the resin. This mixture is reduced to a plastic mass and calendered to sheets of the desired thickness. The preforms 33 are cut from the sheets thus formed.

As suggested, aluminum is a suitable material for the core 28; and, in the drawing the core is shown as an aluminum disc approximately 9½" in diameter, about .036" thick, and of 52-SH or full hard metal as produced by the Reynolds Metals Co. This is a hard-skinned resilient metal capable of retaining its shape under normal handling and abuse. Also, this metal is possessed of a high tensile strength which stands up well under pressures developed in the forming press. The core 28 conveniently may be punched from strip stock and it preferably is then passed through multiple flexing rollers to insure flatness, to improve grain structure and to enhance its flexing qualities. Thinner cores have been found suitable in manufacture.

Before being incorporated in the record, core 28 preferably is treated in a vapor-phase degreasing and cleaning apparatus. Any suitable cleaning fluid may be used for this purpose, a typical example being the hydrocarbon cleaner known commercially as "Philsolv." This cleaning step is not an etching process and does not change the face of the metal but merely insures that the metal is absolutely clean.

The coating of bonding agent 29 is then applied to the core 28 conveniently by a dipping process and at about room temperature. A preferred and pre-eminently satisfactory bonding agent is formed by mixing 3½ lbs. of powdered "VMCH" resin with 10 gallons of commercial grade acetone. "VMCH" resin is made by the Union Carbon and Carbide Co., and comprises about 1% of a dibasic organic acid (preferably maleic acid), 13% vinyl acetate and 86% vinyl chloride. After dipping, the resin solution on the metal core 28 is dried in an air drier. This step leaves a plastic adhesive coating 29 which is attached to the core by both electrostatic and surface tension bonds. The coating 29 does not change the surface of the core 28 but rather preserves the same. Also, by reason of its unique inherent properties, the coating 29 will bond the illustration 26 to the core substantially instantaneously upon application of heat and pressure.

Figure 8:
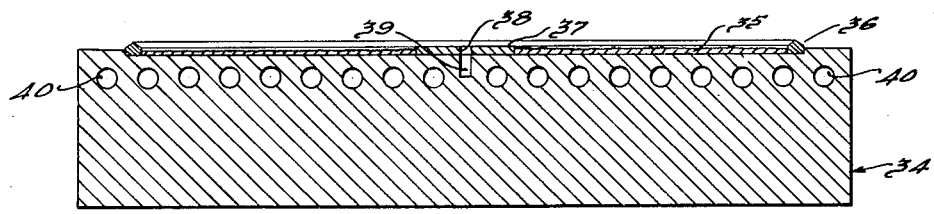
Fig. 8 is a vertical sectional view taken on the line 8—8 of Fig. 7.

The pictorial illustration 26 shown in Fig. 8 is printed by the "off-set" method on #70 off-set paper which is a tough, long-fibered, uncoated, absorbent paper having a calendered or smooth finish. The paper upon which the pictorial illustration is printed is circular in shape and is approximately 9 9/16" in diameter and between .003" and .004" thick. It should be noted that the diameter of the pictorial illustration 26 is slightly larger than the diameter of the core 28. The overlapping margin of illustration 26 is lapped around the edge of the core 28 so that the latter is completely covered by the illustration and does not show through the face of the record. This arrangement is preferred but not essential.

The record 20 is formed in a conventional record press between matrices which may be both steam heated and water cooled. Such a matrix 34 is seen in Figs. 7 and 8. It will be observed that the sound track die 35 is secured to the matrix 34 by an outer retaining ring 36 and an inner retaining center plug 37. Plug 37 has a centrally located aperture 38 which aligns with the centrally located aperture 39 in the matrix 34. A center pin 43 in the opposite matrix 34 (Fig. 9) enters the apertures 38 and 39 and properly aligns the two matrices. A coil of copper tubing may be built into each matrix 34 and is shown in Fig. 8 as the apertures 40. Suitable equipment (not shown) is provided for pumping either heating or cooling liquids through the tubing 40.

Figure 9:
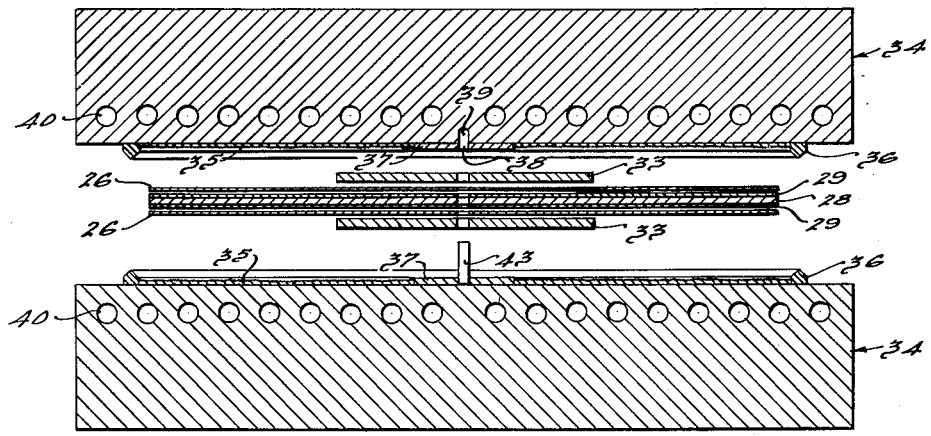
Fig. 9 is a vertical sectional view of the press, showing the upper and lower matrices in open position and the various components of record disposed therebetween preparatory to forming the record.

In actual practice the matrices 34 are disposed in opposed relation in a press equipped with heating, cooling and pressure devices for circulating liquid through the tubing 40. These devices are not shown or described as they are not a part of this invention. The center pin 43 aligns the preforms 33, the illustrations 26 and the core 28 when they are placed in the press and over the pin 43 (Fig. 9).

It will be noted that the rings 36, the sound track dies 35 and the center plugs 37 are oppositely disposed so that both sides of the record 20, when pressed, will be identically formed. The preforms 33, pictorial illustrations 26 and coated core 28 are shown suspended between the matrices 34; but, in actual practice, they are positioned over the pin 43 and lie upon the lower matrix 34 prior to closing the press.

Figure 10:
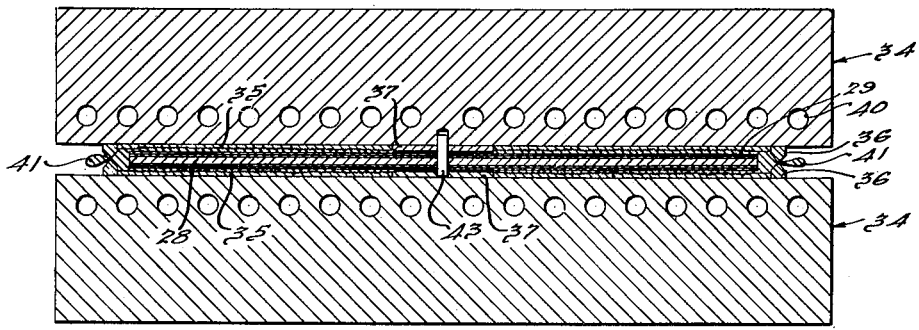
Fig. 10 is a view similar to Fig. 9 but showing the matrices in closed position and the record as it comes from the press after the pressing or extruding operation.

Before they are inserted in the press the preform 33 and resin-coated core 28 are plasticized by preheating for about 1 minute to a temperature of approximately 270° F. The operator then loads the press by placing over the pin 43 and in the order listed a preheated preform 33, a pictorial illustration 26 face down, a preheated coated core 28, a pictorial illustration 26 face up, and a preheated preform 33, the press is then closed to the position shown in Fig. 10 for a short time under pressure; the temperature of the mold (matrix holder) is raised for a short period and then cooled; then opened and the record removed. Any flashing 43 formed during the pressing operation is pared from the record. The edge of the record 20 is then machine trimmed to the edge contour revealed as the rim 23 in Fig. 3.

The preheat step softens coating 29 sufficiently so that it penetrates the illustrations 26 when the press is closed and bonds the same securely to the core 28. The above action occurs at or prior to the time the preforms 33 are extruded so that the illustrations are supported and reinforced by the core 28 and thus are capable of resisting the drag or rub of the plastic material as it flows outwardly in the press. Unless a proper bond is established between the core 28 and the pictorial illustrations 26, the latter will be dragged or rubbed outwardly by the surface tension of the plastic material 22 resulting in distortion, rupture, or explosion of the illustrations. By the use of the bonding agent and the core as hereinbefore described, it has been found that no distortion or rupture whatever occurs in the commercial production of the record 20. This is a very important feature of the invention.

As suggested, the heat conducting qualities and the lateral rigidity characteristic of the core 28 insure a uniform coating of plastic material 22 over the face of the record. Also, when the record is formed according to the present invention the coating 22 is always uniform in thickness and sound track 25 and pictorial illustration 26 are entirely free from air pockets. This is a very important feature and is essential to commercial production. This highly desirable result is achieved by the preheated core 28 transferring excesses in heat from one side of the record to the other whereby to insure equal plasticity and consequently, equal flow of the preforms 33 on either side of core 28. This, in conjunction with the lateral rigidity of the record, which channels the flow of the plastic material laterally, insures the uniform thickness of the coating 22. The lateral rigidity of the core 28 insures that the core 28 will not "fall down" over the lower preform 33 as it rests upon same. Also, as the core 28 is sandwiched between the upper and lower preforms 33 under pressure, it takes up a reasonably true central position between the matrices 34. From the foregoing, it can be seen that, if one preform 33 should flow outwardly in advance of the other, the fact that the core is centrally supported and laterally rigid, will channel the advance flow between the core 28 and the matrix 34, while the core 28 being laterally rigid, maintains its central position which insures the uniform flowing of a coating of plastic material 22 over the faces of the record 20.

When an excess flow does occur, there is an excess of heat which causes the excess flow. This excess of heat is quickly absorbed by the core 28 and transferred to the other side of the core 28 to the other preform 33 which increases that preform's plasticity and allows it to accelerate its flow and catch up with the preform which is flowing in excess. This aids materially in obtaining an even coating of plastic material 22. Also, the absorption of heat by the core retards the excess flowing of one preform in advance of the other.

When the preforms 33 are extruded to the peripheral edge of the core 28, they meet in the area of the rim 23 (Fig. 3) and blend together forming an integral mass, and the excess of the mass flows between the high points on retaining rings 36 (Fig. 10) to form the flash 43. An excess of the plastic mass has been found essential to the unblemished pressing of the record 20.

Various substitutions of materials of like characteristics are considered as equivalents of the materials herein disclosed and therefore within the scope of the invention. Differences in size and proportion to the sizes herein mentioned are also considered within the scope of the invention, such as increased or lessened sizes to make larger and smaller records.

Also included within the scope of the invention are proportional increases and decreases in the thickness of the members of the record to compensate for increases and decreases in the diametrical size of the record such as in making six, eight, twelve, and sixteen inch records.

Having described my invention which is limited only to the scope of the appended claims, I claim:

1. The method of manufacturing an illustrated phonograph record including fabricating a core member from hard-skinned aluminum, coating said core member with a bonding agent by dipping said core member in a solution comprising about three and one-half pounds of a resin consisting of about 1% maleic acid, about 13% vinyl acetate and about 86% vinyl chloride in about ten gallons of acetone, and drying the solution thereon, printing illustrations upon relatively thin sheets of paper, positioning said illustration upon said core member, and bonding said illustration to said core member by extruding plastic material over said illustration in the presence of heat and pressure.

2. The method of manufacturing illustrated phonograph records including fabricating a core member of high tensile strength, coating said core member with a bonding agent, printing illustrations on low tensile strength material as compared to said core member, positioning said illustration upon said core member, extruding plastic material over said illustration and said core member in the presence of heat and pressure with said core supporting said illustration via said bonding agent against the drag and rub of said plastic material as it is extruded over said illustration, thereby preserving said illustration from distortion and impressing sound tracks in the plastic material while it is being extruded.

3. The method of manufacturing an illustrated phonograph record comprising, coating a core member with a bonding agent, positioning a paper illustration on said core member, positioning a biscuit of thermo-plastic material on said paper illustration, and subjecting the group to heat and pressure under a sound track forming matrice to extrude said biscuit over said illustrations, to bond said illustrations to said core via said bonding agent, and to bond said biscuit material to said illustrations whereby an integrated illustrated phonograph record is produced.

4. The method of manufacturing an illustrated phonograph record comprising, coating a core member with a bonding agent, pre-heating said coated core member, positioning a paper illustration on said core member, positioning a biscuit of thermo-plastic material on said paper illustration, and subjecting the group to heat and pressure under a sound track forming matrice to extrude said biscuit over said illustrations, to bond said illustrations to said core via said bonding agent, and to bond said biscuit material to said illustrations whereby an integrated illustrated phonograph record is produced.

5. The method of manufacturing an illustrated phonograph record comprising, fabricating a core member of material having good heat conducting qualities, coating said core member with a bonding agent, pre-heating said coated core member, positioning a paper illustration on said core member, positioning a pre-heated biscuit of thermo-plastic material on said paper illustration, and subjecting the group to heat and pressure under a sound track forming matrice to extrude said biscuit over said illustrations, to bond said illustrations to said core via said bonding agent, and to bond said biscuit material to said illustrations whereby an integrated illustrated phonograph record is produced.

6. The method of manufacturing an illustrated phonograph record comprising, fabricating a core member of material having good heat conducting qualities, coating said core member with a heat responsive bonding agent, preheating said core member to activate said bonding agent and to uniformly heat said core member, positioning illustrations on either side of said core member, positioning pre-heated biscuits of thermo-plastic material over each said illustration, and subjecting the group to heat and pressure between sound track forming matrices to extrude said biscuit over said illustrations, to bond said illustrations to said core via said bonding agent, and to bond said biscuit material to said illustrations whereby an integrated illustrated phonograph record is produced.

7. The method of manufacturing an illustrated phonograph record including fabricating a core member of material having good heat conducing characteristics, coating said core member with a bonding agent, preheating said core member, positioning an illustration on either side of said core member of a size sufficient to cover said core member, centrally positioning preheated biscuits of thermo-plastic material having poor heat conducting characteristics on each said illustration, subjecting the assembled group to heat and pressure between sound track forming matrices whereby said illustrations are bonded to said core member via the coating of bonding agent on said core member; said biscuits are bonded to said illustrations via the adhering characteristics of the thermo-plastic material of said biscuits; a sound track is impressed in the thermo-plastic material of said biscuits via the sound track matrices; and an even layer or coating of thermo-plastic material is deposited over said illustrations due to said core member absorbing heat from overheated portions of said biscuits and transferring heat to underheated portions of said biscuits.

8. The method of manufacturing an illustrated phonograph record comprising positioning a thermoplastic biscuit centrally of a bottom round track matrice, positioning an illustrated member centrally of said matrice face down on said biscuit, positioning an adhesive coated core on said illustrated member centrally of said matrice, positioning a second illustrated member face up on said coated core centrally of said matrice, positioning a second thermoplastic biscuit centrally of said matrix on said second illustrated member, pressing a second sound track matrice relative to said first matrice to sandwich said biscuits, illustrations and core therebetween whereby said biscuits are extruded and bonded to said illustrations, said illustrations are bonded to said core, and sound tracks are impressed in the material of said biscuits simultaneously.

9. The method of manufacturing an illustrated phonograph record comprising centrally positioning an opaque biscuit of partially polymerized material which is transparent when fully polymerized on a sound track matrice, centrally positioning an illustrated member face down on said biscuit, centrally positioning an adhesive coated core on said illustrated member, centrally positioning a second illustrated member on said core, centrally positioning a second biscuit on said second member, centrally positioning a second matrice to said first matrice and said intermediate members, and subjecting the intermediate members to heat and pressure between said matrices whereby simultaneously said biscuits are fully polymerized and rendered transparent, said biscuits are extruded radially outwardly, sound tracks are impressed in said biscuits, said biscuits are bonded to said illustrated members and said illustrated members are bonded to said core to form an integrated illustrated phonograph record.

THOMAS F. SAFFADY.

REFERENCES CITED

The following references are of record in the file of this patent:

UNITED STATES PATENTS

| Number | Name | Date |
|---|---|---|
| 1,179,660 | Sanders | Apr. 18, 1916 |
| 1,477,117 | Gleason | Dec. 11, 1923 |
| 1,877,254 | Ritter | Sept. 13, 1932 |
| 1,915,384 | Reilly et al. | June 27, 1933 |
| 1,926,130 | Whyte | Sept. 12, 1933 |
| 1,932,889 | Groff | Oct. 31, 1933 |
| 1,946,596 | Symonds | Feb. 13, 1934 |
| 2,008,092 | Biber | July 16, 1935 |
| 2,306,726 | Hasin | Dec. 29, 1942 |
| 2,329,456 | Campbell | Sept. 14, 1943 |
| 2,401,987 | Taylor et al. | Oct. 30, 1943 |

FOREIGN PATENTS

| Number | Country | Date |
|---|---|---|
| 315,104 | Great Britain | July 11, 1929 |
| 391,457 | Great Britain | Apr. 28, 1933 |